Nov. 26, 1968     P. N. MIGDAL     3,413,636
RADAR CROSS SECTION AUGMENTER

Filed Jan. 31, 1967     3 Sheets-Sheet 1

INVENTOR.
PHILIP N. MIGDAL
BY
Knox & Knox

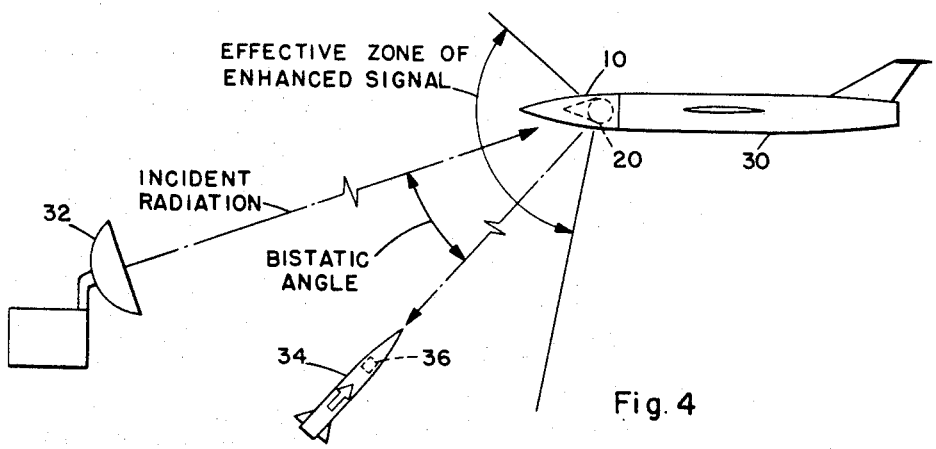
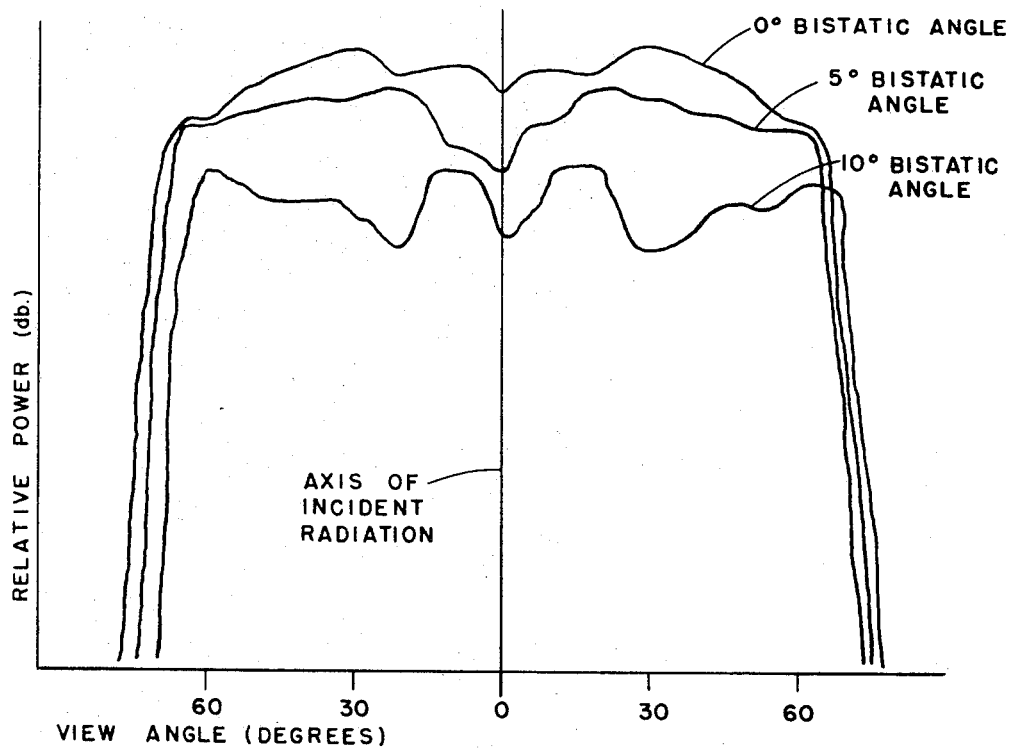

United States Patent Office 3,413,636
Patented Nov. 26, 1968

3,413,636
RADAR CROSS SECTION AUGMENTER
Philip N. Migdal, 9315 Carmichael Drive,
La Mesa, Calif. 92041
Filed Jan. 31, 1967, Ser. No. 612,902
8 Claims. (Cl. 343—18)

ABSTRACT OF THE DISCLOSURE

A lens type passive radar cross section augmenter is incorporated into an aerodynamic body, together with a novel dielectric structure which causes multiple reflection and scattering of radiation and improves the bistatic response of the augmenter.

Background of the invention

The present invention relates to radar and specifically to a radar cross section augmenter for increasing the strength or brightness of a radar signal reflected from the augmenter.

Radar cross section augmenters, or echo enhancers as they are sometimes known, are used on drone aircraft or missiles used for tracking and target practice, or on decoys which are intended to simulate much larger objects. Among the augmenters in present use are corner reflectors, Luneberg lenses, Eaton lenses and the like. However, these are all essentially monostatic, that is, the reflected energy is returned along the path of incident radiation with very little spread or scattering. This is satisfactory when the transmitting and receiving units use a common antenna, or are very close together. But in some instances the receiver may be considerably separated from the transmitter and may even be changing position. One example of such a situation is a fixed transmitter illuminating a target, with the receiver contained in an aircraft or missile which is guided to the target by the reflected energy, in a direction other than along the axis of the incident radar beam. For this type of operation it is necessary to use a radar reflector having a good bistatic pattern of reflectivity, or one which will reflect energy in directions other than along the incident path.

Summary of the invention

The augmenter described herein utilizes a dielectric lens with an associated reflector to receive, concentrate and reflect radiation, the lens being contained in an aerodynamic body in which is a core of dielectric material. The reflector is mounted on one side of the lens and, on the other side, the dielectric has a configuration which will cause re-reflection and scattering of reflected radiation over a useful angular field of dispersion about the axis of incident radiation.

Brief description of the drawings

FIGURE 4 is a diagram of a typical operation utilizing the augmenter;

FIGURE 5 is a graph showing distribution of reflected energy from the augmenter.

Description of the preferred embodiments

Figure 1:
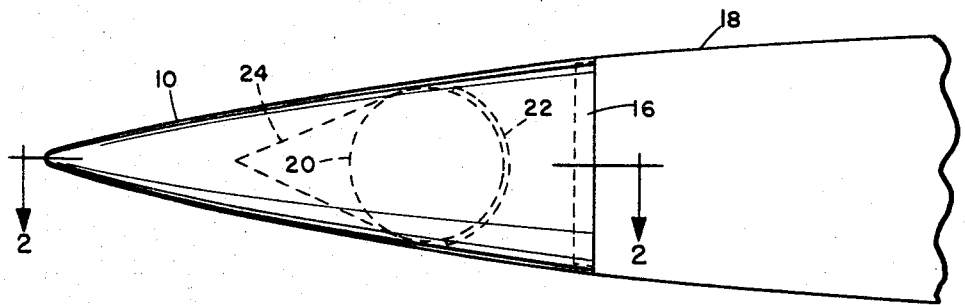
FIGURE 1 is a side elevation view of a complete augmenter incorporated in a nose cone.
Figure 2:
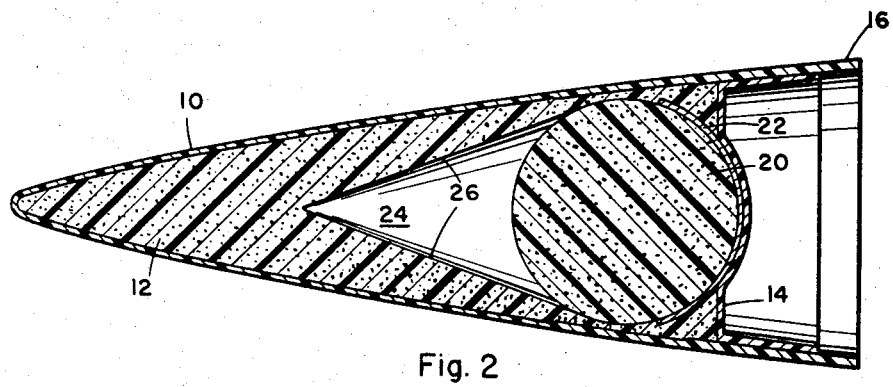
FIGURE 2 is an enlarged sectional view taken on line 2—2 of FIGURE 1.

Since the augmenter is usually mounted externally of the vehicle on which it is carried, in order to avoid shielding by the vehicle structure, it must be enclosed in an aerodynamic housing. In FIGURE 1 this housing is in the form of a streamlined radome 10, which could be mounted on the nose of a missile, or on the nose, tail, or wing tips of an aircraft, the exact shape depending on the performance range of the vehicle. Sometimes several augmenters are mounted in different positions for all around coverage. The radome is a thin walled dielectric shell which is essentially transparent to microwave energy in the required range, the design and characteristics of such radomes being well known. The major portion of the radome 10 is substantially filled by a core 12 of dielectric foam material, the rear end being closed by a plug 14 leaving an annular flange 16 by which the radome is attached to supporting structure 18, indicated in broken line in FIGURE 1.

At the rear end the core 12 is shaped to hold a dielectric lens 20, the rear portion of which has a close fitting metallic cap forming a reflector 22. Lens 20 may be a Luneberg or Eaton type lens, or a prolate spheroid of the type described in assignee's copending application for William R. Bradford, Ser. No. 460,778, filed June 2, 1965, now Patent No. 3,334,345, entitled Passive Radar Target Augmenter. The purpose of the lens is to focus microwave energy, arriving on a substantially flat phase front, to a point on the surface of reflector 22, which reflects the concentrated energy back in the direction of the incident radiation.

Forward of the lens 20 the core has a cavity 24, illustrated as a simple conical shape for an example. However, various configurations may be used, such as stepped portion, curved walls, flat surfaces and many combinations thereof according to the required performance. The purpose of the cavity is to provide dielectric surfaces 26 forward of the lens which will re-reflect portions of the reflected radiation from the lens, back into the lens at different angles from the incident radiation. The core material has a dielectric constant chosen to reflect a predetermined portion of microwave energy and transmit the remainder, the transmitted energy being focused by the lens 20 and reflected back toward the source. A portion of this energy will pass through the core while the remainder will be re-reflected to the lens in a diffuse manner and will not be focused properly by the lens, but will be reflected forward in a scattered manner. The resulting multiple reflections will cause scattering of the reflected radiation over a wide field, as opposed to the normal concentrated beam along the incident path. By proper design of the reflective surfaces 26 the zone of useful enhanced reflection or echo can be controlled to suit specific requirements.

Figure 3:
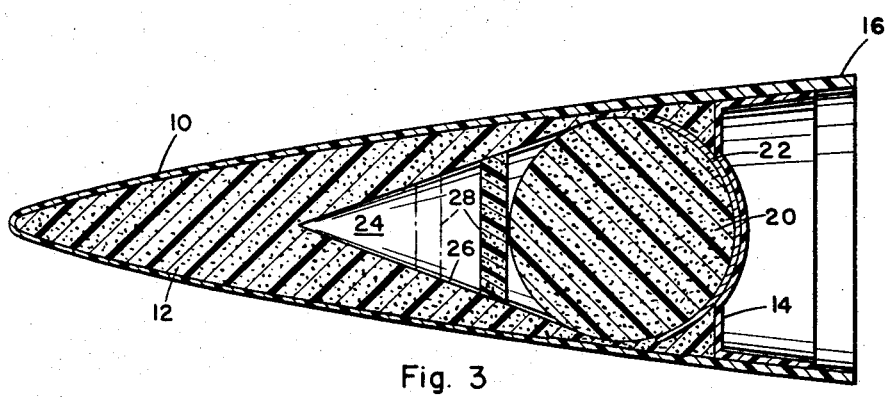
FIGURE 3 is a similar sectional view showing additional internal reflectors.

A simple way of providing readily formed and positioned dielectric surfaces is by use of one or more inserts 28 in cavity 24, as in FIGURE 3. These are of dielectric foam or similar material and may be of different densities to provide particular reflective characteristics. Inserts 28 may be of many different configurations and located at various positions, the flat plates indicated merely being an example.

A typical situation in which the bistatic response is required is shown in FIGURE 4. The augmenter is mounted on the nose of a drone aircraft 30, which is being tracked by a radar transmitter 32. A missile 34, fired at the drone, contains the receiver 36 and is guided to the drone by the reflected radiation. The angle contained between the axis of incidence from the transmitter to the drone and the axis of reflection from the drone to the receiver is defined as the bistatic angle. From anywhere within the effective zone of enhanced signal the receiver will receive a sufficiently strong signal to maintain proper guidance. This makes it possible to use a semi-active homing missile, which is normally used only as a beam rider travelling substantially along the transmitted beam.

Typical signals, measured from an actual augmenter under test, are shown graphically in FIGURE 5. The particular augmenter had a useful zone of signal enhancement view angle extending approximately 60 degrees on either side of the axis of incident radiation. At zero degrees bistatic angle the signal is naturally highest and is reasonably constant over the entire effective zone. At 5 degrees bistatic angle the overall signal strength is slightly lower, but remains at generally the same level over the effective zone. At a bistatic angle of 10 degrees the overall signal strength is slightly lower again, but still remains reasonably constant over the effective zone.

By proper design of the dielectric and reflective elements the effective zone of enhancement can be controlled to suit requirements, and could be narrower than that indicated. For wider or total coverage of a vehicle, several augmenters can be used, either separately in different locations, or grouped and oriented to different directions.

Figure 6:
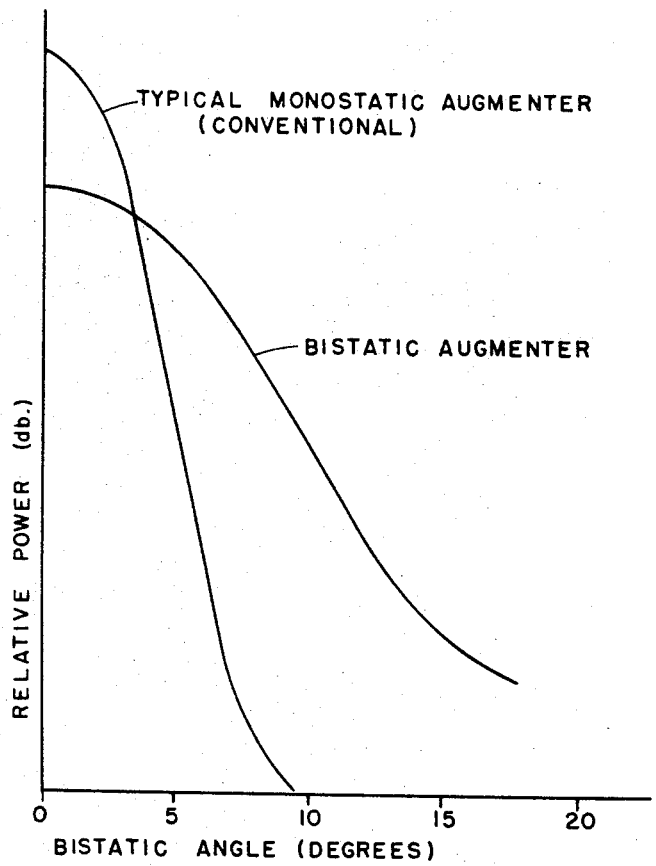
FIGURE 6 is a graph comparing the response of a conventional augmenter with that of the improved bistatic augmenter.

FIGURE 6 indicates the bistatic response of a typical monostatic lens echo enhancer compared with the response of the improved bistatic augmenter. It should be noted that the conventional monostatic return indicates an almost specular peak at the incident axis (0° bistatic), falling off rapidly at any angle off axis. The improved bistatic reflector has an increased bistatic response which is obtained at the expense of a decreased specular return. This decrease in specular return is due to the diffusive nature of the dielectric surfaces in front of the reflector.

It is understood that minor variation from the form of the invention disclosed herein may be made without departure from the spirit and scope of the invention, and that the specification and drawings are to be considered as merely illustrative rather than limiting.

I claim:
1. A radar cross section augmenter, comprising:
   supporting means;
   a dielectric lens fixed in said supporting means and having a reflector on a rear portion thereof to focus incident radiation on the reflector and reflect the radiation substantially in the direction of incidence;
   and reflective means fixedly mounted forward of said lens to re-reflect radiation into the lens at different angles from the incident radiation, said reflective means being of dielectric material partially reflective and partially transparent to radiation, through which a portion of the incident radiation can pass to said lens.

2. The structure according to claim 1, wherein said supporting means comprises a radiation transparent shell having a dielectric core therein, said lens being mounted in said core, said core having a cavity forwardly of said lens, and reflective surfaces in the cavity.

3. The structure according to claim 2, wherein said reflective surfaces comprise at least portions of the walls of said cavity.

4. The structure according to claim 2, wherein said reflective surfaces include dielectric reflective elements fixedly mounted in said cavity.

5. The structure according to claim 4, wherein said dielectric reflective elements are of different densities.

6. The structure according to claim 1, and including:
   an aerodynamic body comprising a thin walled radiation transparent shell;
   a dielectric core substantially filling said shell;
   said lens being mounted in said core;
   and reflective elements in said core forwardly of said lens.

7. The structure according to claim 6, wherein said core has a cavity forwardly of said lens, at least portions of the walls of said cavity constituting reflective surfaces.

8. The structure according to claim 7, and including dielectric reflecting elements fixedly mounted in said cavity.

References Cited

UNITED STATES PATENTS 3,295,132  12/1966  Chapman _____ 343—18

OTHER REFERENCES

Huynen: Theory and Design of a Class of Luneberg Lenses, IRE Wescon, 1958, pp. 219, 227, 228.

RODNEY D. BENNETT, *Primary Examiner.*

BRIAN L. RIBANDO, *Assistant Examiner.*